June 6, 1967          H. ANFINSET          3,324,213

METHOD OF MAKING DECORATIVE ARTICLES

Filed April 29, 1965          2 Sheets-Sheet 1

Hans Anfinset
INVENTOR.

BY Karl F. Ross
Attorney

June 6, 1967  H. ANFINSET  3,324,213
METHOD OF MAKING DECORATIVE ARTICLES
Filed April 29, 1965  2 Sheets-Sheet 2
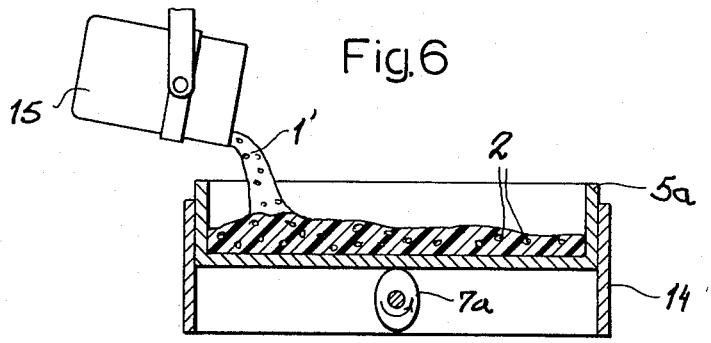
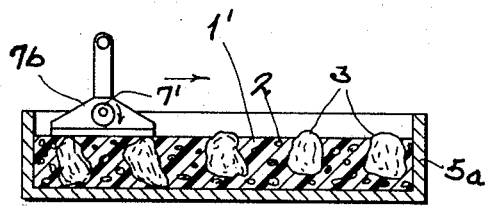
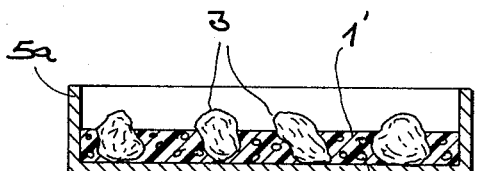
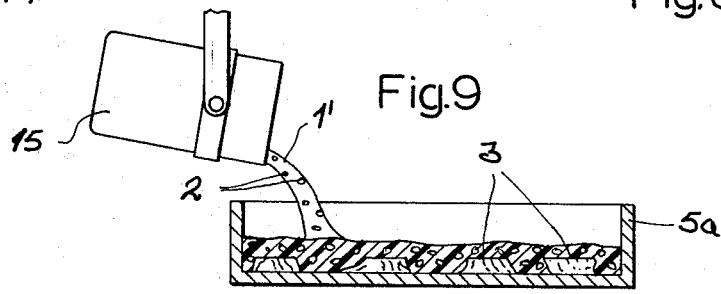
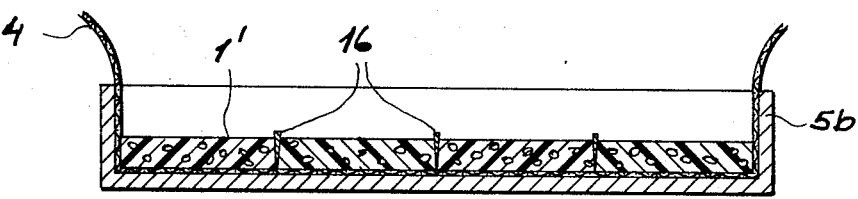
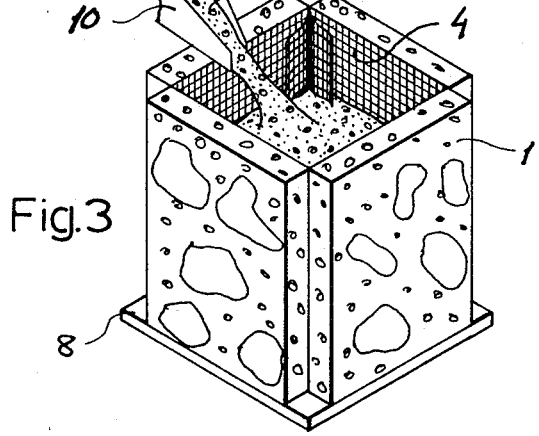
Hans Anfinset
INVENTOR.
BY Karl F. Ross
Attorney

United States Patent Office 3,324,213
Patented June 6, 1967

3,324,213
METHOD OF MAKING DECORATIVE ARTICLES
Hans Anfinset, Sogn, Oslo, Norway, assignor to ANFI A/S, Oslo, Norway, a corporation of Norway
Filed Apr. 29, 1965, Ser. No. 451,585
Claims priority, application Norway, Oct. 16, 1959, 133,439; Sept. 7, 1962, 3,917
2 Claims. (Cl. 264—71)

This application is a continuation-in-part of my co-pending application Ser. No. 307,562 filed Sept. 9, 1963, now abandoned.

My present invention relates to decorative articles having broad surfaces, such as tiles, facing plates, pencils, columns, prismatic posts, steps, table tops and the like, with a mosaic or terrazzo effect on their exposed surface or surfaces.

Attempts have been made in the past to produce articles of this class by imbedding decoratively shaped and/or differently colored pebbles, plastic chips, mineralic fragments or other particles in a resinous base serving as a binder. The known methods generally suffered from the difficulty of controlling the distribution of the particles to obtain the desired surface effect, with the result that many particles either sank too deep into the plastic mass or rested so loosely thereon as to become easily detached.

The general object of my invention is, therefore, to provide a method of producing such articles in a simple and inexpensive manner with avoidance of the aforedescribed drawback.

It is also an object of this invention to provide novel decorative effects in a tile, flagstone or similar plate-shaped article by a simple and inexpensive procedure.

Another object of my invention is to provide a method of making a highly stress-resistant and fireproof structure of the character set forth.

A more particular object of this invention is to provide a method of producing a novel structure of this character which, in terms of flexural and compressive strength, modulus of elasticity and resistance to atmospheric influences, compares favorably with conventional structures of the type using a polyester matrix and a particulate filler.

I have found, in accordance with this invention, that the above objects can be realized through the use of a polyester-base binder having a filler of relatively small mineral granules substantially uniformly distributed therein. To this end the binder material, while still in solution, is thoroughly mixed until the granules are properly dispersed in the plastic mass, a deposit of solid elements being then applied to the surface of the mass (or vice versa) whereupon the binder is allowed to harden. These solid elements, which should be substantially larger than the uniformly dispersed granules, may be mineral particles though pieces of different material (e.g. metal or glass) may also be used.

The viscous blend of polyester and finely comminuted mineral granules, prepared in accordance with this invention as a matrix to receive the larger solids, is constituted only to a minor extent by organic plastic material, specifically in a proportion of substantially 5–15 parts, by weight, of polyester for every 100 parts of final product taking into account the larger solid particles subsequently added. This extremely low percentage of polyester increases the mechanical strength and the fire-retarding ability of structures so prepared, as compared with conventional products of this type in which the comminuted filler is introduced concurrently with or subsequently to the immersion of the larger solids. Tests have shown, in fact, that plates made in conformity with these conventional methods must have a polyester content upwards of approximately 20%, by weight, in order to withstand even a modicum of mechanical stress.

The technique according to my invention may be used, as described in my aforementioned prior application, to form a viscous layer on which flat-faced decorative chips or pebbles are floatingly disposed so as to be flush with the layer surface, e.g. by being forcibly imbedded therein with the aid of a suitable piston. By a reversal of this procedure, such substantially flat-faced elements may be intitally deposited on the bottom of a mold where they are subsequently covered, to the desired level, by a previously prepared fluid blend of polyester matrix and comminuted filler so that, upon hardening, it will be the underside of the composite that exhibits a special decorative effect. It is, however, also possible to utilize terrazzo particles or fragments of irregular shape which subsequently (i.e after hardening of the matrix) may be ground off, if desired, to the level of the layer surface; in that case the large solids will generally extend completely from one surface of the matrix to the other.

A composite panel or other article of the character specified may also be provided with a web or fabric of artificial filaments (preferably glass fibers) serving as a backing or reinforcement therefor if extraordinarily high bending strengths are desired. Such backings may be made larger than the plate surface to which it adheres so that a marginal strip thereof projects from one or more edges of the plate. These projecting marginal strips may then be used to affix the plate to a support or to join several such plates to one another. In particular, plates so joined may constitute a prismatic cavity adapted to be filled with concrete or other cementitious material to form a block which, upon hardening, is bonded to the enveloping plates whereby an attractively surfaced post or similar structure is obtained.

The polyesters preferentially used in the practice of my invention are unsaturated reaction products of a dicarboxylic acid and a dihydroxy alcohol, e.g. as produced from equimolar quantities of maleic anhydride and ethylene glycol, in a suitable solvent such as styrene. Polyester solutions of this description are available under the commercial name "Polylite." This material may be admixed with various cross-linking agents, such as methyl-ethyl ketone peroxide or benzoyl peroxide, to promote quick hardening either under ambient conditions or at moderately elevated temperatures. Other possible additives include dimethylamine and dilute solutions of cobalt naphthenate, along with suitable colorants if required; to insure uniform distribution, such colorants should be admixed with the matrix during or before the initial blending step. Polyvinyl chloride, preferably in the form of scrap, may be included in the mixture without the addition of further solvent, the polyester acting as a plasticizer therefor.

The fluid mass incorporating a granular filler, instead of being cast in a mold, may be applied as a coating to a reasonably flat surface of a su'table sub.trate. In the latter case I prefer to use a coarse brush with hard bristles, e.g., a mechanically rotated steel brush, for the triple purpose of applying the solution, homogenizing the distribution of the comminuted filler material and scrubbing the surface of the substrate to eliminate the need for any preliminary cleansing of that surface. When the coating has been applied in this manner and the larger solid elements previously referred to have been imbedded in its exposed surface, it is allowed to set whereupon it may be subjected to a final polishing operation with a like type of brush. The latter operation will remove any chips or fibers projecting from the hard coating and impart a smooth finish thereto.

The granular filler material may be supplemented by short strands of filamentary material, such as glass-fiber cuttings, for increased viscosity.

The particle size of the granular filler material may generally range from near 0 to approximately 1 cm. in diameter, the length of the filamentary cuttings (if any) being preferably not more than about 1 or 2 cm. Fine granules are recommended for use with the above-described coating process.

Several ways of practicing my improved process have been illustrated in the accompanying drawing in which:

FIG. 3 is a perspective view illustrating the formation of a post with the aid of a prismatic mold constituted by several plates of the general type shown in FIG. 1;

Figure 5:
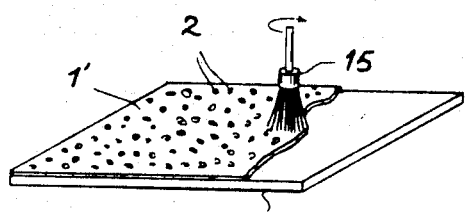

FIG. 5 perspectively illustrates the coating of a supporting plate by my improved process;

FIG. 6 is a cross-sectional view of another type of mold, illustrating a somewhat different procedure of producing structures according to the invention;

FIG. 7 is a view similar to FIG. 6, showing a further step in that procedure;

FIG. 8 is again a view similar to FIG. 6, illustrating a modification of the procedure just referred to;

FIG. 9 is still another cross-sectional view of the same general type, showing a further possible variation in the molding procedure; and FIG. 10 is a cross-sectional view of a mold adapted to be used in forming the structure illustrated in FIG. 3.

Figure 1:
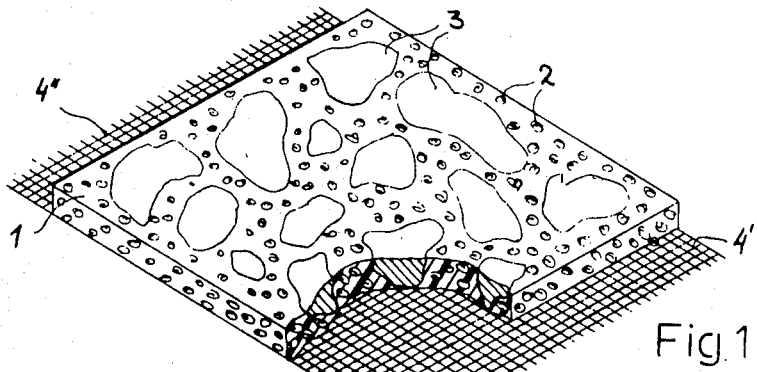
FIG. 1 is a perspective view of a decorative plate (parts broken away) with backing sheet produced by the present method.

In FIG. 1 I have shown a composite plate 1 which comprises a polyester-base body with a granular mineral filler 2 incorporated in the plastic matrix and substantially uniformly dispersed therethrough. The visible upper surface of plate 1 has imbedded therein a deposit of larger, flat-surfaced decorative pebbles or chips 3 flush with the upper plate surface. A backing sheet 4 of interwoven glass fibers adheres to the other plate surface and projects beyond two opposite edges of plate 1 to form a pair of marginal strips 4', 4". Depending upon the procedure employed (as described below with reference to subsequent figures) the particles 3 will penetrate the plate 1 in depth to a greater or less extent.

Figure 2:
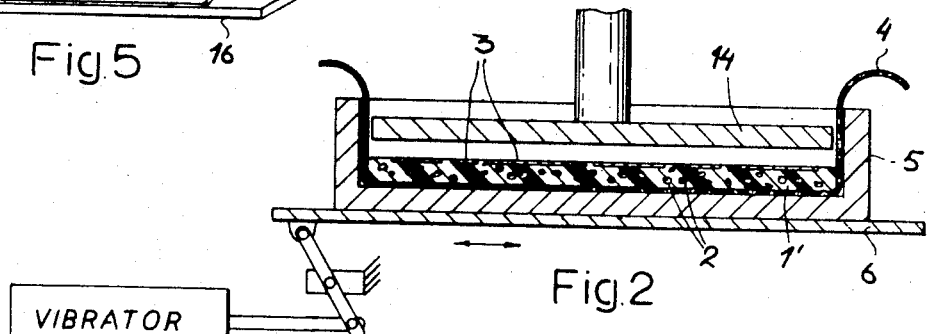
FIG. 2 is a somewhat diagrammatic cross-sectional view of a mold for producing the structure shown in FIG. 1.

The structure of FIG. 1 may be produced in a mold 5, shown in FIG. 2, whose cavity is lined with the glass-fiber fabric 4 and which has deposited thereon the resinous solution 1' with the granules 2 substantially uniformly dispersed therein by mixing. Mold 5 is positioned on a vibratile table 6 which can be oscillated by means of a vibrator 7. The chips 3 are floatingly deposited on the surface of the mass 1' in its state of incipient gelling and are allowed to settle into the mass as the vibrator 7 is set in motion; they may also be forced into the surface by means of a plunger 14. The subsequent hardening of the plastic matrix may proceed at ambient temperatures or with application of heat, depending on the composition of the matrix as more fully described hereinafter.

Other possible manufacturing methods for the composite of FIG. 1, all involving the same basic process, will be described hereinafter with reference to FIGS. 6-9. The exposed upper surface of the structure may be made smooth and level, if necessary, by a separate grinding or polishing step after the composite has hardened.

The lateral portions of sheet 4 not in contact with mass 1', upon suitable trimming, form the marginal strips 4', 4" of FIG. 1. It will be apparent that, if desired, the sheet 4 could also be allowed to project beyond the other edges of plate 1 to form a frame around the latter.

The marginal frame or strips of glass-fiber fabric can be utilized for the temporary or permanent mounting of the plate 1 on a support or for the interconnection of several such plates. The latter arrangement is illustrated in FIG. 3 where four adjoining plates 1, adhering to a common strip 4 with ends clipped or otherwise tied together at one edge of the structure, constitute the walls of a prismatic mold having a bottom plate 8. Concrete 9 is poured into this mold from a spout 10 so as to envelop the matting 4 and to bond the plates 1 whereby a decoratively surface block or post is formed.

Figure 4:
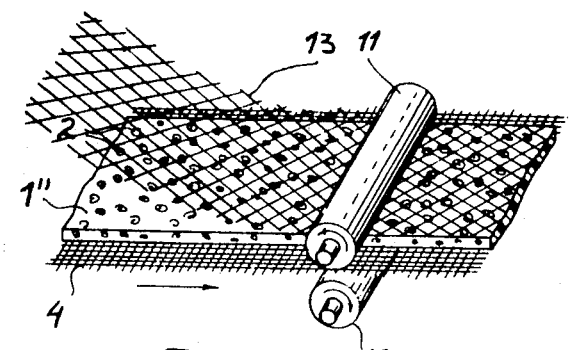
FIG. 4 is a somewhat diagrammatic perspective view illustrating the application of a decorative coating to a plastic mass in the production of a modified type of plate.

FIG. 4 illustrates how a plastic mass 1", backed by a glass-fiber fabric 4, is transported in a semifluid state over a supporting surface (not shown) into the bite of a pair of oppositely rotating calender rollers 11, 12. A web 13 of plastic filaments (e.g. nylon), forming a wide-mesh netting, is concurrently fed to the rollers 11, 12 so as to be pressed by them into the surface of the viscous mass 1" containing a filler of granules 2. The rollers 11, 12 may be heated to expedite the hardening of the binder material. If desired, decorative pebbles or chips 3 (FIG. 1) may also be deposited on the upper surface of the resulting composite layer, in the interstices of netting 13, either ahead of the rollers 11, 12 or at a location between the latter and a further roller pair (not shown). The hardened composite, which may have been guided beyond the rollers in a heated environment to expedite curing, is then cut to the desired plate size, with the laterally projecting portions of sheet 4 again constituting the marginal strips 4' or 4" of FIG. 1. Netting 13 may have a color contrasting with that of the base material 1".

FIG. 5 illustrates the application of a hardenable coating 1', 2 to a supporting plate 16 with the aid of a mechanically rotatable brush 15; the stiff bristles of this brush scrub the surface of plate 16 to make it receptive to the coating. When the latter has been applied, larger decorative particles 3 (FIG. 1) may be deposited thereon prior to its hardening, as by being dropped or shot onto or into the surface. Once the coating has fully set, brush 15 may be used to polish it. Such a polishing operation may, of course, also be performed on the plate 1 of FIG. 1.

In FIG. 6 I have shown a mold 5a, generally similar to mold 5 of FIG. 2, which is slidably guided for limited vertical displacement by a frame 14 and is provided with a vibrator 7a, shown as a rotary cam, contacting the underside of the mold. A plastic mass 1' is poured into the mold 5a from a mixer 15 in which a charge of granules 2 had previously been thoroughly distributed throughout that mass. When the mold has been filled to the desired depth, the vibrator 7a is stopped and addiitonal particles, i.e. larger chips or chunks 3, are introduced into the matrix 1' from above as is illustrated in FIG. 7. Next, as likewise shown in FIG. 7, a vibrator 7b with a flat underside, whose oscillation may be caused by a continuously rotating unbalanced weight 7', is moved manually or automatically across the upper surface of the composite 1', 2, 3 during the gelling process to level this surface and to imbed the newly added pieces fully within the mass; naturally, further small-size granules 2 may be added at this stage in the same manner if desired. As illustrated in FIG. 7, the average thickness of the chunks 3 has been made approximately equal to the depth of the mass 1' so that most of them extend substantially completely across the structure. After hardening, the upper surface (or, if exposed, both surfaces) of the resulting composite may be subjected to a grinding, polishing, brushing or other finishing treatment.

FIG. 8 shows the same mold 5a after deposition of a mass 1', 2, as described in connection with FIG. 6. In contra-distinction to the procedure shown in FIG. 7, however, FIG. 8 illustrates how the size of the chunks 3 may be so chosen with reference to the level of the fluid mass that these chunks, or at least a good number of them, project above the upper surface of the matrix in a decorative but irregular pattern. Naturally, there will be no grinding or polishing treatment of the surface in this instance.

FIG. 9 illustrates a reversal of the methods previously described, i.e. the deposition of pebbles or other large particles 3 at the bottom of the empty mold 5a prior to introduction of the mass 1', 2 from mixer 15. The pieces 3 may here be suitably precut or otherwise preshaped flat-faced elements resting with their flat surfaces on the mold bottom so that, after hardening of the composite, the underside thereof will have a smooth and decorative appearance. Again, the level of the fluid mass may be selected to be just equal to the height of the particles 3 or may somewhat exceed that height. Vibrators are necessary also in this case.

FIG. 10 shows an enlarged mold 5b for the simultaneous casting of the four plates making up the prismatic block of FIG. 3. A strip 4 of glass fiber or the like is imbedded in the mold, in the manner described in connection with FIG. 2, and the poured layer 1' is subdivided by wooden or other parting strips 16 into four identical rectangular segments. The mass 1' may again have incorporated therein, apart from the granules of filler material 2, decorative chips or pieces (not shown in FIG. 10) by any of the procedures described above. After hardening, the composite is removed and the dividers 16 are extracted between the four composite plates so produced.

The following examples give typical compositions adapted to be used with the aforedescribed manufacturing processes:

*Example I*

10 kg. of unsaturated polyester as heretofore defined, such as "Polylite 8000" having a viscosity of 600 to 1000 cps., a specific weight of 1.13 and an acid number of 10 to 20, is admixed with 0.05 kg. of cobalt naphthenate in the form of a 6% styrene solution, 100 g. of methylethyl ketone peroxide and a filler having the following composition:

| | Kg. |
|---|---|
| Granite particles of 1 mm. maximum diameter | 15 |
| Granite particles of 1 to 3 mm. diameter | 15 |
| Granite particles of 3 to 8 mm. diameter | 20 |
| Glass-fiber cuttings | 0.25 |

The entire mass is thoroughly stirred for about three minutes. The so homogenized mixture is next filled into a mold, e.g. as shown in FIG. 2 or 6, whereupon 40 kg. of sepentine particles 20 to 40 mm. in diameter (or maximum width) is deposited on a surface of the fluid mass which is vibrated as described above. The plastic matrix is then allowed to set, the hardening process taking about two hours at 20° C. When the above structure is hardened, the weight ratio of polyester to the overall composition is found to be substantially 10%.

*Example II*

0.5 kg. of "Polylite 8000" and 0.5 kg. of "Polylite IB," the latter having a viscosity of 2000 to 3000 cps., an acid number of 10 to 20 and a specific weight of 1.24, are admixed with 0.01 kg. of cobalt naphthenate, 0.02 kg. of a pigment such as chrome-oxide green, a filler composed of 7 kg. of quartz grains up to 3 mm. in diameter and 0.2 kg. of microdole (commuuniuted Norwegian dolomite) ground in a suitable vehicle such as tallow, and finally 0.02 kg. of methylethyl ketone peroxide serving as a hardening promoter. This mixture may be cast in a mold and otherwise treated in the manner described with reference to Example I or may be used as a coating on a substrate as set forth in connection with FIG. 5 with incorporation of large-size particles (3) in an amount of, say, 6 kg. When the above structure is hardened, the weight ratio of polyester to the total composition is found to be substantially 7%.

*Example III*

The mixture of Example I is modified by the omission of the cobalt naphthenate and the methylethyl ketone peroxide, these ingredients being replaced by 300 g. of a paste of benzoyl peroxide dissolved in styrene. This composition can be cured at elevated temperatures under light pressure, e.g. in an arrangement as illustrated in FIG. 4 with the rollers 11, 12 thereof electrically heated to about 80° to 120° C.; it could also be used in the mold 5 of FIG. 2, with similar heating of its plunger 14.

The compositions described above may be modified by the use of different polyesters or polyester mixtures, of the general type set forth above, depending on the desired degree of hardness and other characteristics (e.g. transparency). It is also possible to add to the starting solution a quantity of polyinvyl chloride, e.g. in a proportion of about one-fifth of the weight of the unsaturated polyester as described in my abandoned application Ser. No. 61,878 filed Oct. 11, 1960.

The weight ratio of filler materials and polyester compounds, given in the foregoing examples, may be varied between a lower limit of substantially 6:1 (corresponding to a polyester proportion of approximately 17%) and an upper limit of substantially 20:1 (corresponding to a polyester ration of approximately 5%). Throughout this range, the resultant product remains firm and coherent. The relatively small proportion of organic matter enhances the resemblance to natural minerals. As the proportion of polyester is reduced, the fire-retarding properties of the resulting structure are improved; with lower percentages of polyester (e.g. substantially less than 10%), however, it is desireable to reduce the maximum particle size of the filler by eliminating, advantageously, the fraction of granules of 3–8 mm. diameter of Example I to insure greater homgeneity and coherence of the composition.

I claim:

1. A method of making decorative broad-surface articles, comprising the steps of admixing a filler of mineral granules with an unsaturated polyester resin solution containing a cross-linking agent, substantially uniformly distributing said filler in the solution, forming the mixture into a generally plate-shaped mass, thereafter depositing decorative elements substantially larger than said granules on a horizontal surface of said mass prior to hardening thereof, the proportion of solids in said polyester solution ranging from 5% to substantially less than 10%, by weight, of the combination of said solids, said elements and said filler, vibrating said mass for letting said elements settle into said mass at said surface, and allowing said mass to set, the largest of said granules being about 3 mm. in diameter.

2. A method as defined in claim 1, further comprising the step of grinding off projecting portions of said elements to the level of said surface upon the hardening of said mass.

References Cited

UNITED STATES PATENTS

| | | | |
|---|---|---|---|
| 2,042,964 | 6/1936 | Rinehart. | |
| 2,118,526 | 5/1938 | Robinson | 117—20 |
| 2,751,775 | 6/1956 | Sergovic | 161—43 |
| 2,850,890 | 9/1958 | Rubenstein. | |
| 3,055,148 | 9/1962 | Christy | 52—309 |
| 3,097,080 | 7/1963 | Weir. | |
| 3,194,859 | 7/1965 | Wacker | 264—123 |

ALEXANDER WYMAN, *Primary Examiner.*

W. POWELL, *Assistant Examiner.*